(12) United States Patent
Niemelä

(10) Patent No.: US 11,070,567 B2
(45) Date of Patent: Jul. 20, 2021

(54) METHOD FOR DETECTING AND PREVENTING AN ATTACK

(71) Applicant: F-Secure Corporation, Helsinki (FI)

(72) Inventor: Jarno Niemelä, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 233 days.

(21) Appl. No.: 15/953,550

(22) Filed: Apr. 16, 2018

(65) Prior Publication Data
US 2018/0302419 A1 Oct. 18, 2018

(30) Foreign Application Priority Data
Apr. 18, 2017 (GB) .................................... 1706067

(51) Int. Cl.
*H04L 29/06* (2006.01)
*H04L 9/06* (2006.01)
(Continued)

(52) U.S. Cl.
CPC ...... *H04L 63/1416* (2013.01); *G06F 16/2255* (2019.01); *G06F 21/564* (2013.01);
(Continued)

(58) Field of Classification Search
CPC . H04L 63/1416; H04L 9/3239; H04L 63/145; H04L 9/0643; G06F 21/64; G06F 21/56; G06F 21/564; G06F 16/2255
See application file for complete search history.

(56) References Cited

U.S. PATENT DOCUMENTS 7,337,471 B2 * 2/2008 Nachenberg .......... G06F 21/564
709/223
8,295,486 B2 * 10/2012 Bender ................. H04L 9/3236
380/270
(Continued)

FOREIGN PATENT DOCUMENTS

WO WO 2004/074968 A2 9/2004

OTHER PUBLICATIONS

"Does collision resistance imply (or not) second-preimage resistance?" Article dated Jun. 28-30, 2014 (4 pages) https://crypto.stackexchange.com/questions/17924/does-collision-resistance-imply-or-not-second-preimage-resistance (Year: 2014).*
(Continued)

*Primary Examiner* — Joseph P Hirl
*Assistant Examiner* — Thomas A Gyorfi
(74) *Attorney, Agent, or Firm* — Harrington & Smith (57) ABSTRACT

Method of detecting an attack against a function on a client computer including generating a first hash value having a weak collision resistance; sending the first hash value to a server computer for storing to a database of known hash value pairs, a hash value pair including the first hash value and a second hash value calculated for the entity, the second hash value having a strong collision resistance, receiving a request for the entity with an object including a first hash value and a second hash value; accepting the received object and transmitting data relating to the received object to the server computer for a validity check when the first hash value of the received object is identical with the first hash value stored in the local database, and detecting a hash collision attempt when the hash value pairs do not match.

17 Claims, 4 Drawing Sheets

(51) Int. Cl.
 G06F 16/22 (2019.01)
 H04L 9/32 (2006.01)
 G06F 21/56 (2013.01)

(52) U.S. Cl.
 CPC .......... H04L 9/0643 (2013.01); H04L 9/3239 (2013.01); H04L 63/145 (2013.01)

(56) References Cited

U.S. PATENT DOCUMENTS

| | | | | |
|---|---|---|---|---|
| 8,954,738 B2* | 2/2015 | Asokan | ............... | H04L 9/3242 |
| | | | | 713/168 |
| 2004/0220975 A1* | 11/2004 | Carpentier | ............. | G06F 21/64 |
| 2008/0168564 A1* | 7/2008 | Lerouge | ................. | G06F 21/64 |
| | | | | 726/26 |
| 2008/0195868 A1* | 8/2008 | Asokan | .................. | G06F 21/64 |
| | | | | 713/176 |
| 2008/0289038 A1* | 11/2008 | Kim | ....................... | G06F 21/10 |
| | | | | 726/22 |

OTHER PUBLICATIONS

Wikipedia article for "Preimage attack" dated Dec. 11, 2015 (2 pages) https://en.wikipedia.org/w/index.php?title=Preimage_attack&oldid=694719852 (Year: 2015).*

Dan Goodin. "Fatally weak MD5 function torpedoes crypto protections in HTTPS and IPSEC" Article published Jan. 6, 2016 from Ars Technica (6 pages) https://arstechnica.com/information-technology/2016/01/fatally-weak-md5-function-torpedoes-crypto-protections-in-https-and-ipsec/ (Year: 2016).*

* cited by examiner

METHOD FOR DETECTING AND PREVENTING AN ATTACK

TECHNICAL FIELD

The present invention relates to detection of malware on a computer system. More specifically, the present invention relates to methods and apparatuses for detecting and preventing attacks against a function, such as a security function, at a client computer.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™, (OS™, Windows Mobile™, and Blackberry OS™, Anti-malware products traditionally rely on local scanning technologies or on full-file hash network queries. Local technologies are installed on the equipment of a user and include signature-based detection and heuristic detection. Signature-based detection is based on searching for known patterns of data within executable code, while heuristic detection is based on searching for mutations or refinements of known malware. Signature-based detection and heuristic detection rely on database updates for their knowledge of known malware and the database needs to be up-to-date at all times to maximise the efficiency of these methods. How generic the signature or heuristic detection schemes are affects the ability of the anti-malware product to provide protection to the user equipment.

Network-based full-file hash queries first apply a transform such as a cryptographic hash function to a malware program in order to obtain a hash value, which forms a unique representation of the malware program. The hash value is then used to identify the malware at the network by comparing the value against values in a database. Examples of transforms for generating hash values are MD5 and SHA-1. With this technique, the cryptographic hash of each scanned item is used to determine whether the item has been seen before, and, in such case, its reputation. This approach does not require a local database, but cannot aim to provide a generic level of protection due to the very nature of cryptographic hash methods because a very minor change in the malware will result in a completely different hash value.

Current anti-malware products rely mostly on a combination of local scanning techniques and network based hash look-ups. These mechanisms have each their problems, namely the former is heavily dependent of its database to provide a level of generic protection, while the latter lacks generality.

The current threat landscape shows a continuous increase in the number of malicious attacks that are threatening the security of internet users. Combating these malicious attempts is challenging due to the ability of malware authors to produce unique variations of their creations that are then distributed to victims through a variety of infection paths. The variations of the malware creations make it difficult for anti-malware to detect the malware by simply recognising it based on an earlier version of the malware stored in a database.

The present invention is provides an effective method of detecting attackers pursuing to subvert an anti-malware product. Since attackers may be able to reverse engineer and test the products for as long as they like, the defender is always at disadvantage and may not realise anything fishy going on until it is too late. Thus, there is a need for ways to lay traps for the attackers for making them reveal themselves. In addition to revealing subvert attempts on systems, such methods should also keep the attackers unaware of how they are being detected.

SUMMARY OF THE INVENTION

According to a first aspect, there is provided a method of detecting an attack against a function on a client computer. The method comprises at the client computer: generating a first hash value of an entity, the first hash value having a weak collision resistance and whereby the entity is protecting a function; storing the generated first hash value to a local database; sending the first hash value to a server computer for storing to a database of known hash value pairs, a hash value pair comprising the first hash value and a second hash value calculated for the entity, the second hash value having a strong collision resistance; receiving, from a second computer, a request for the entity with an object comprising a first hash value and a second hash value; in the event that the first hash value of the received object is identical with the first hash value stored in the local database, accepting the received object and transmitting data relating to the received object to the server computer for a validity check, wherein the validity check comprises comparing the hash value pair of the object with the hash value pair of the entity stored in the database at the server computer and detecting a hash collision attempt in case the hash value pairs do not match; receiving the result of the validity check, and in case the result indicates that the hash collision attempt is detected, making further action relating to the received object.

In an embodiment, the first hash value is generated by using one of: a CRC (cyclic redundancy)-32 checksum, other error-detecting code function, a cryptographic hash function, a SHA-1 algorithm or an MD5 hash (e.g. an unsalted MD5).

In an embodiment, the second hash value is calculated by using one of: a SHA-2 algorithm or other cryptographic hash function having a corresponding strength. The second hash value may be calculated at the client computer or at the server computer.

In an embodiment, the method further comprises allowing the second computer circumvent a non-critical security function in the event the first hash value of the received object is identical with the first hash value.

In an embodiment, the validity check further comprises detecting the hash collision attempt when a first hash value having a weak collision resistance is being paired at the client computer with an incorrect second hash value having a strong collision resistance.

In an embodiment, the received object may be blocked in case the hash collision attempt is identified.

In an embodiment, the result of the validity check is stored on a database at the client computer or at the server for sharing a reputation of the object with other client computers.

In an embodiment, the method further comprises deciding at the server computer whether the entity is malware based on the validity check.

According to a second aspect, there is provided a method of detecting an attack against a function on a client computer. The method comprises, at a server computer: receiving, from a client computer, a first hash value of an entity, the first hash value having a weak collision resistance and whereby the entity is protecting a function at the client computer; storing the received first hash value to a database of known hash value pairs, a hash value pair comprising the first hash value and a second hash value calculated for the entity, the second hash value having a strong collision resistance; receiving, from the client computer, data relating to an object received with a request for the entity, at the client computer, from a second computer, the object comprising a first hash value identical with the first hash value stored in the database and a second hash value; performing a validity check for the object wherein the validity check comprises comparing the hash value pair of the object with the respective hash value pair stored in the database at the server computer and detecting a hash collision attempt in case the hash value pairs do not match; and transmitting the result of the validity check to the client computer, and in case the result indicates that the hash collision attempt is detected, making further action relating to the received object.

The validity check may further comprise detecting the hash collision attempt when a first hash value having a weak collision resistance is being paired at the client computer with an incorrect second hash value having a strong collision resistance.

In an embodiment, the server computer is further configured to decide whether the object is malware based on the validity check and send an alarm or block the object if the object is found malicious on the basis of the validity check.

According to a third aspect, there is provided a client computer comprising: a processor for generating a first hash value of an entity, the first hash value having a weak collision resistance and whereby the entity is protecting a function; a database for storing the generated first hash value; a transmitter for sending the first hash value to a server computer for storing to a database of known hash value pairs, a hash value pair comprising the first hash value and a second hash value calculated for the entity, the second hash value having a strong collision resistance; a receiver receiving, from a second computer, a request for the entity with an object comprising a first hash value and a second hash value; a processor configured to accept the received object and transmitting data relating to the received object to the server computer for a validity check in the event that the first hash value of the received object is identical with the first hash value stored in the local database, wherein the validity check comprises comparing the hash value pair of the object with the hash value pair of the entity stored in the database at the server computer and detecting a hash collision attempt in case the hash value pairs do not match; a receiver for receiving the result of the validity check, and a processor for making further action relating to the received object in case the result indicates that the hash collision attempt is detected.

According to a fourth aspect, there is provided a server computer comprising: a receiver for receiving, from a client computer, a first hash value of an entity, the first hash value having a weak collision resistance and whereby the entity is protecting a function at the client computer; a database of known hash value pairs for storing the received first hash value, wherein a hash value pair comprises the first hash value and a second hash value calculated for the entity, the second hash value having a strong collision resistance; a receiver for receiving, from the client computer, data relating to an object received with a request for the entity, at the client computer, from a second computer, the object comprising a first hash value identical with the first hash value stored in the database and a second hash value; a processor for performing a validity check for the object wherein the validity check comprises comparing the hash value pair of the object with the respective hash value pair stored in the database at the server computer and detecting a hash collision attempt in case the hash value pairs do not match; and a transmitter for transmitting the result of the validity check to the client computer, and a processor for making further action relating to the received object in case the result indicates that the hash collision attempt is detected.

According to a fifth aspect, there is provided a computer program comprising computer readable code, which, when run on a computer, causes it to act as a client computer according to the third aspect or a server according to the fourth aspect.

According to a sixth aspect, there is provided a computer program product comprising a non-transitory computer readable medium and a computer program according to the fifth aspect, wherein the computer program is stored on the computer readable medium.

DETAILED DESCRIPTION

The present invention can apply to any processing system, terminal, server, corresponding component, or to any computer system or combination of different communications systems that support the required functionality. Due to the rapid development of the specifications of computer systems and protocols that are used, all words and expressions should be interpreted broadly; they are intended only to illustrate the embodiment.

Figure 1:
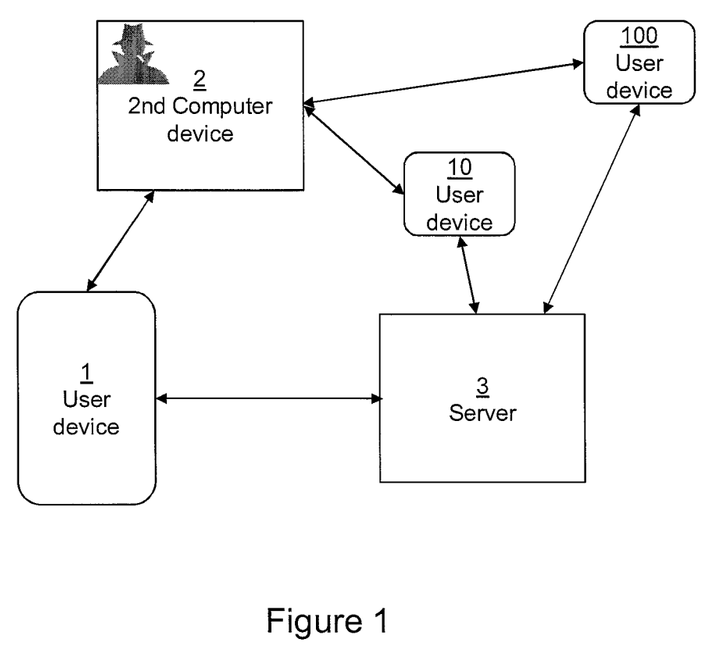
FIG. 1 illustrates schematically in a block diagram an exemplary network architecture.
Figure 4:
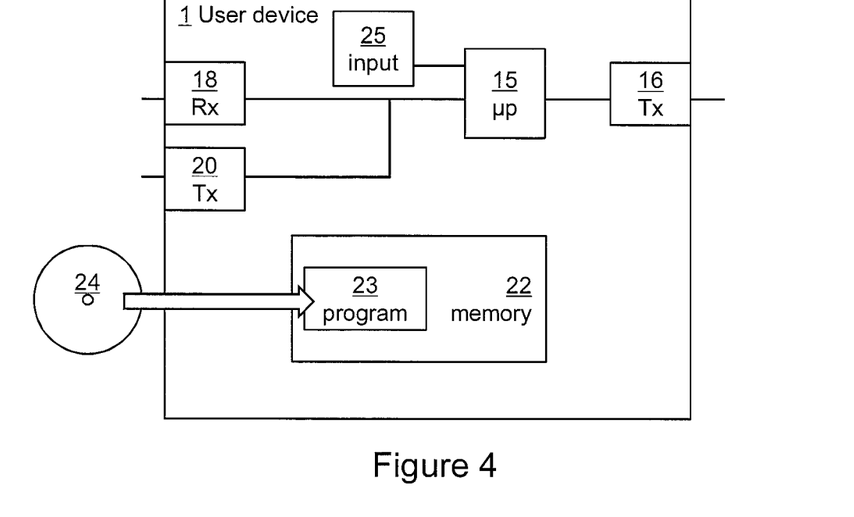
FIG. 4 illustrates schematically in a block diagram a user device.
Figure 5:
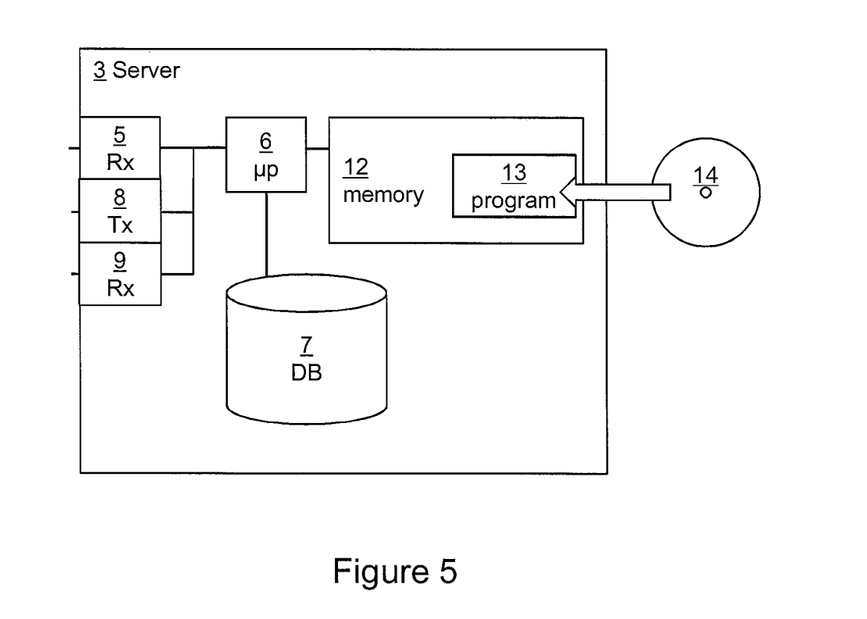
FIG. 5 illustrates schematically in a block diagram a server.

FIGS. 1, 4 and 5 illustrate general examples of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in the figures. The connections shown are logical connections and the actual physical connections may be different. It is apparent to a person skilled in the field that the arrangement may also comprise other functions and structures. For example, the functional entities of the user device 1 may physically reside in separate locations also. Some or part of the device processes may be implemented using cloud computing in which resources are provided to a local client on an on-demand basis, usually by means of the Internet.

FIG. 1 shows a simple network architecture in which user devices/clients 1, 10, 100, such as personal computers, smartphones, mobile phones, laptops or tablets, are in communication with other network elements such as other computer devices 2 and server computers 3 in the Internet. The $2^{nd}$ computer device 2 may also refer to targets of uniform resource locators (URLs) but may also be a referent of any uniform resource identifier or internationalized web resource identifier. The user devices 1, 10, 100 are in communication with a server computer/backend 3 and can also connect to other data sources. The devices may connect by any suitable communications network, for example via the Internet.

A client is a term used to indicate an application running on a user equipment. This application is able to monitor, interpret and analyse events at the operating system. If it is necessary, the client contacts the server according to the method disclosed herein. In the context of the method disclosed herein, the client is to be considered an executor of instructions received from the server; it is up to the client to perform, based on its set of primitives, possibly heavy computations.

The server is provided by one or more interconnected computers that are tasked with interacting with the clients by way of a number of different interfaces. The server receives the requests and data from clients, analyses them and makes the result of these analysis available to all of the clients.

A hash function is any function that may be used to map data of arbitrary size to data of fixed size. The values returned by a hash function are called hash values, hash codes, digests, or hashes. A cryptographic hash function is a hash function that has certain properties which make it suitable for use in cryptography. It is a mathematical algorithm that maps data of arbitrary size to a bit string of a fixed size (a hash function). It is designed to also be a one-way function, that is, a function that is infeasible to invert. The only way to recreate the input data from an ideal cryptographic hash function's output is to attempt a brute-force search of possible inputs to see if they produce a match, or use a "rainbow table" of matched hashes.

The security level of a cryptographic hash function may be defined using the following properties: Pre-image resistance (given a hash value h it should be difficult to find any message m such that h=hash(m), and functions lacking this property are vulnerable to preimage attacks), Second pre-image resistance (given an input m1 it should be difficult to find different input m2 such that hash(m1)=hash(m2) and functions lacking this property are vulnerable to second-preimage attacks), and Collision resistance (it should be difficult to find two different messages m1 and m2 such that hash(m1)=hash(m2), and such a pair is called a cryptographic hash collision, a property sometimes referred to as strong collision resistance).

Cryptographic hash functions are usually designed to be collision resistant. However, many hash functions that were once thought to be collision resistant were later broken. MD5 and SHA-1, for example, both have published techniques more efficient than brute force for finding collisions. Some hash functions have a proof that finding collisions is at least as difficult as some hard mathematical problem (such as integer factorization or discrete logarithm).

Weak collision resistance (CR), or second-preimage resistance, is the property that given xx and h(x)h(x) (hh a hash function) it's difficult to find x'≠xx'≠x such that h(x')=h(x) h(x')=h(x). Strong CR, or just collision resistance, is the property that it's difficult to find any two x,x'x,x' with the same hash value.

As discussed above, the inventors have appreciated that there is a need for a method that screams out loudly that an attacker is trying to subvert the system while keeping the attacker same time unaware that he is in fact signalling his actions.

Herein disclosed is a method of detecting an attack against a function, for example a security function, on a client computer that solves the problems discussed above. In an embodiment, the attacker is "tricked" into believing that he is able to circumvent a security mechanism or a dialog. The method basically sets a lure for the attacker.

In an embodiment, in order to "trick" the attacker, a weak hash (weak hash here relating to a hash having a weak collision resistance, e.g. CRC-32) check is placed at some part of an entity at the client computer where the entity is guarding a function that the attacker wants to subvert. Information about results of this check operation is sent to upstream, to a server backend for example. The backend server then checks the upstreamed data for collisions in the weaker hash with a stronger hash (a strong hash here relating to a hash having a strong collision resistance or at least stronger than said weak hash has, e.g. SHA-2 256 bit variant) function. If a collision in the weaker hash is found, then an alert on the attacker activity is given in the backend.

A practical example is, for example, file whitelisting, certificate whitelisting or other common operation that is secured by hash values. The attacker may be able to bypass the local security feature, but at backend an alert would be given and a response may be triggered without the attacker being aware as to why he was caught. Thus, the method may be used to place a canary value that is intended to be cracked for the attackers.

In an embodiment, a weak hash value is placed in a location that controls something that the attacker would like to subvert. In an embodiment, this feature is online dependent.

In an embodiment, information about all local check operations on this hash uploading, the checksum result and any information that is to be checked is upstreamed to the backend. A strong hash value is then used for a hash collision check. If the hash collision is detected, then malicious reputation information about the object that caused the collision is sent. It is also possible to alert SOC/CSIRT (Intrusion analysis/Incident Response) depending on the nature of the product or the service.

As an example, the client computer may have a feature or an element checking and whitelisting some kind of objects, for example SSL certificates. The whitelist may be using a checking mechanism that can be subverted with hash collision, for example with CRC-32. In addition to doing the local whitelisting, the client computer also has a telemetry stream sending all objects or strong object hashes, for example SHA-256, to upstream. Whether sending the objects or object hashes may depend on the object sizes and frequency the client computer encounters them.

The goal of the attacker is to pass a fraudulent object so that it will match the client whitelist. If the attacker is able to pass the fraudulent object, he will be able to circumvent some non-critical security mechanism or a dialog, which is basically a lure for the attacker. In reality what is going on is that this "telemetry" upstream is the actual detection mechanism and the local badly implemented checking is a purposefully placed lure to make the attacker to identify himself.

In the backend, a strong hash value (hash value having a strong collision resistance) can be calculated for the object or the strong and the weak hash values may be compared. A database of known weak hash value/strong hash value pairs is maintained at the backend security server. If a weak hash is detected as being paired in the client with an incorrect strong hash, then it becomes evident that the attacker is trying for a hash collision in the client computer.

A correct hash value pair for a SSL certificate is, for example:
CRC-32 0xCAFEBABE
SHA256 0xAABBCCEEFFetc.
whereas the fraudulent certificate offered to the client computer may, for example, be:
CRC-32 0xCAFEBABE
SHA256 0x112233445566etc.

As both real and the fake certificates have the same CRC-32, the client computer will accept the object and the attacker is lured into concluding that his attempt was successful. However, in the backend, an alarm is given and the collision attempt can be reacted to accordingly.

What the reaction to the detected collision attempt will be, may depend on the product and situation. For example, an alarm may be given and/or the certificate may be blocked in the backend. This way the attacker will be caught while at the same time the attacker has no idea why that happened.

The previous example used a certificate as an example, however, the same approach would work on any kind of objects.

Figure 2:
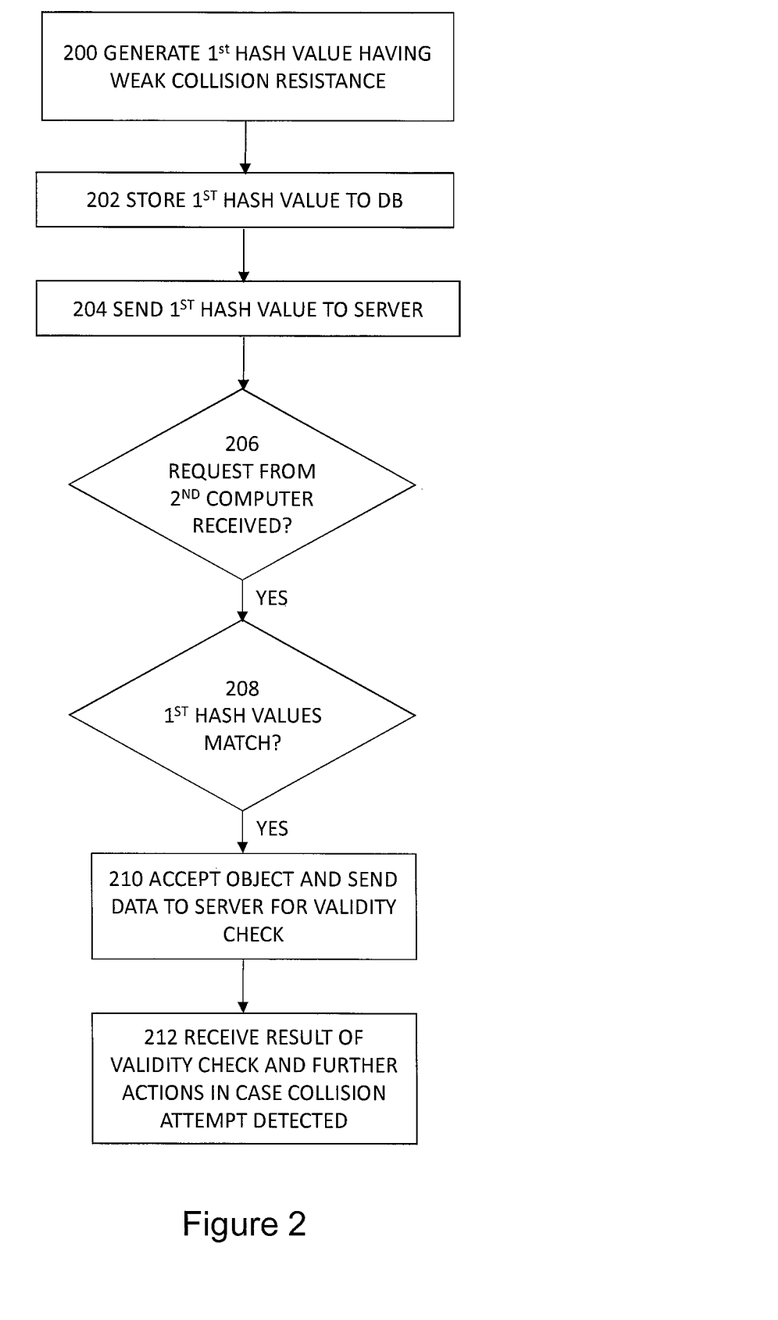
FIG. 2 is a flow diagram showing exemplary steps.

FIG. 2 is a flow diagram that illustrates an example method.

In 200, a first hash value having a weak collision resistance (weak hash) is generated of an entity. The entity is protecting any function, such as a security function at the client computer. The weak hash is calculated in the client computer.

In 202, the generated first hash value is then stored to a local database of the client computer.

In 204, the first hash value is also sent to a server computer for storing to a database of known hash value pairs maintained at the server computer or at some other location controlled by the server computer. A hash value pair comprises the first hash value and a second hash value calculated for the entity, the second hash value having a strong collision resistance (a strong hash value). The strong hash value may be calculated either in the client computer or in the server computer. In the event the strong hash value is calculated in the client computer, then it may be calculated in a different, seemingly unrelated part of the code, for example. The weak hash value is, thus, stored both in the client computer and the server computer. However, a hash value check using the weak hash value is only done in the client computer.

In 206, the client computer detects a request for the entity with an object comprising a first hash value and a second hash value. The request is received from a second computer (a possible attacker).

In 208, the client computer compares the received first hash value with the first hash value previously stored in the local database and in the event that the first hash value of the received object is identical with the first hash value stored in the local database, 210 is entered where the received object is accepted and data relating to the received object is transmitted to the server computer for a validity check. The validity check comprises, for example, comparing the hash value pair of the object with the hash value pair of the entity stored in the database at the server computer and detecting a hash collision attempt in case the hash value pairs do not match.

In 212, the client computer receives the result of the validity check, and in case the result indicates that the hash collision attempt is detected, then further action relating to the received object is made. The further action may be blocking or quarantining the object/second computer, for example.

Figure 3:
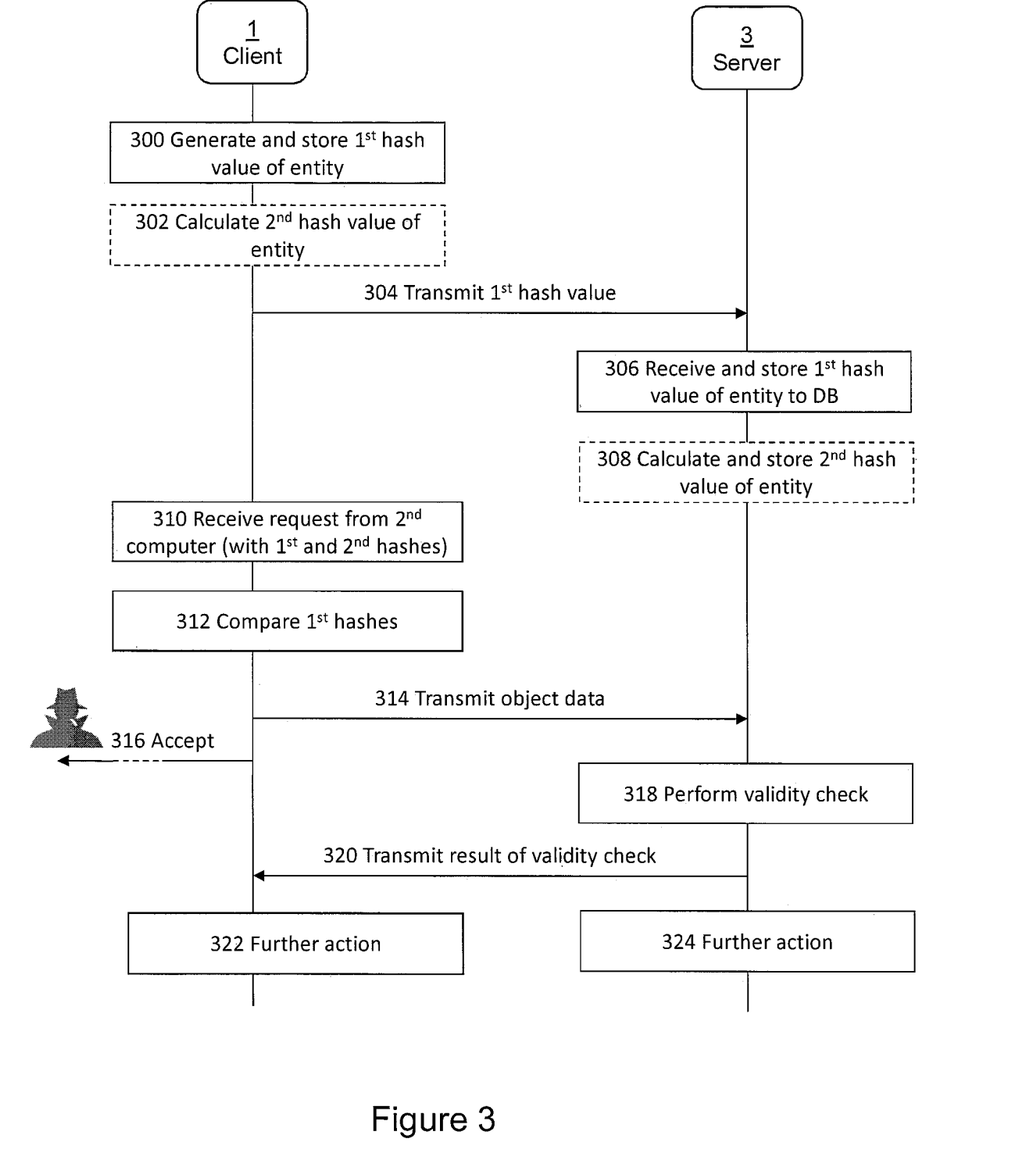
FIG. 3 is a signalling diagram between a client and a server.

FIG. 3 is a signalling diagram between a client 1 and a server 3.

300: Client generates and stored the first hash value having a weak collision resistance of an entity.

302, 308: Client or server calculates the second hash value having a strong collision resistance of the entity.

304: Client transmits the generated first hash value to the server.

306: Server receives the first hash value and stores it to the database.

310: Client receives a request from a second computer for the entity with an object comprising a first hash value and a second hash value.

312: Client compares the first hash values (stored and received).

314: Client transmits data relating to the object in the event the first hash values match. The data sent may comprise any of: the first hash value, the second hash value, other object data, any data relating to the second computer.

316: Client transmits an acknowledgement to the second computer about the accepted object.

318: Server performs a validity check on the basis of the received data relating to the object and the previously stored data in the database. The validity check may comprise comparing the hash value pair of the object with the hash value pair of the entity stored in the database at the server computer and detecting a hash collision attempt in case the hash value pairs do not match. The validity check may also include other actions related to the received data.

320: Server transmits the results of the validity check to the client.

322, 324: Client and/or server may both initiate further actions relating to the object/second computer depending on the results of the validity check.

Turning now to FIG. 4, there is shown an exemplary apparatus, such as a client device or a user device 1. A first transmitter 16 is provided that is arranged to send communication over the Internet or other network. A processor 15 is provided that is arranged to generating a first hash value of an entity, the first hash value having a weak collision resistance and whereby the entity is protecting a function. A memory/database 22 is provided for storing the generated first hash value. A second transmitter 20 is provided for sending the first hash value to a server computer. A receiver 18 is provided for receiving, from a second computer, a request for the entity with an object comprising a first hash value and a second hash value. The processor 15 is further configured to compare the first hash values and accept the received object and the second transmitter 20 is further configured to transmit data relating to the received object to the server computer for a validity check in the event that the first hash value of the received object is identical with the first hash value stored in the local database. The receiver 18 is further configured to receive the result of the validity check, and the processor 15 is further configured to make further action relating to the received object in case the result indicates that the hash collision attempt is detected.

FIG. 5 shows an example of a server 3. The server 3 is provided with a first receiver 5 that receives a first hash value of an entity from the user device, the first hash value having a weak collision resistance and whereby the entity is protecting a function at the user device. A database of known hash value pairs 7 is maintained for storing the received first hash value. A hash value pair comprises the first hash value and a second hash value calculated for the entity and the second hash value has a strong collision resistance. A second receiver 9 is provided for receiving, from the user device, data relating to an object received with a request for the entity, at the user device, from a second computer. The object comprises a first hash value identical with the first hash value stored in the database and a second hash value. A processor 6 is provided for performing a validity check for the object. The validity check comprises comparing the hash value pair of the object with the respective hash value pair stored in the database 7 and detecting a hash collision attempt in case the hash value pairs do not match. The transmitter 8 is further configured to transmit the result of the validity check to the user device. The processor 6 is configured to make further action relating to the received object in case the result indicates that the hash collision attempt is detected.

In the above description, the server 3 is described as having different transmitters and receivers. It will be appreciated that these may be disposed in any suitable manner, for example in a single transmitter and receiver, a transceiver and so on. Similarly, a single processor 6 is described but it will be appreciated that the function of the processor may be performed by a single physical processor or by more than one processor.

The server 3 is also provided with a non-transitory computer readable medium in the form of a memory 12. The memory may be used to store a computer program 13 which, when executed by the processor 6, causes the processor 6 to perform the functions described above. Note that the computer program 13 may be provided from an external source 14 such as a carrier wave, a flash disk, a disk and so on.

In the above description, the user device 1 is described as having different transmitters and receivers. It will be appreciated that these may be disposed in any suitable manner, for example in a single transmitter and receiver, a transceiver and so on. Similarly, a single processor 15 is described but it will be appreciated that the function of the processor may be performed by a single physical processor or by more than one processor.

The user device 1 is also provided with a non-transitory computer readable medium in the form of a memory 22. The memory may be used to store a computer program 23 which, when executed by the processor 15, causes the processor 15 to perform the functions described above. Note that the computer program 23 may be provided from an external source 24 such as a carrier wave, a flash disk, a disk and so on. A software application may also be implemented in use by code, stored in the hard disk drive, running on the processor.

It will be appreciated by the person of skill in the art that various modifications may be made to the above described embodiment without departing from the scope of the present invention. For example, the database may be located in a separate entity to the user device/server, in which case the user device/server will send queries remotely to the database.

The steps, points, signalling messages and related functions described above in relation to FIGS. 2 and 3 are in no absolute chronological order, and some of the steps may be performed simultaneously or in a different order. Other functions may also be executed between the steps or within the steps, and other signalling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or an article of manufacture which can contain, store, or maintain programming, data or digital information for use by or in connection with an instruction execution system, including the processor in the exemplary embodiment.

An embodiment provides a computer program product that comprises a non-transitory computer-readable medium bearing a computer program code that is embodied therein for use with a computer.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

The invention claimed is:

1. A method, comprising:
   detecting an attack by an attacker against a security function on a client computer, comprising:
   generating a first hash value of an entity for the client computer, the first hash value having a second-preimage resistance, wherein the first hash value of the entity is generated using a first collision resistance, wherein the first hash value is generated to be weak and placed in a location that controls the security function on the client computer to enable the attacker use of the first hash value to bypass the security function causing the attack at the client computer to appear successful to the attacker;

storing the generated first hash value to a local database, comprising sending the first hash value to a server computer for storing to a local database of known hash value pairs as a hash value pair the generated first hash value and a second hash value calculated for the entity, the second hash value having a collision resistance stronger than the first hash value having the second-preimage resistance;

receiving, from the attacker via a second computer, a request for the entity with an object comprising a hash value pair of the received object comprising a first hash value and a second hash value, wherein the attack is from the second computer;

based on the first hash value of the received object being determined as identical with the first hash value having the second-preimage resistance stored in the local database, accepting the received object and transmitting data relating to the received object to the server computer for a validity check, wherein the validity check comprises comparing the hash value pair of the object with the hash value pair including the first hash value having the second-preimage resistance of the entity stored in the local database at the server computer to determine whether the first hash value and the second hash value of the hash value pair of the object and the first hash value and the second hash value of the hash value pair of the entity stored in the local database match;

based on the validity check identifying that the hash value pair of the object and the hash value pair for the entity stored in the local database do not match, a hash collision attempt is detected; and receiving the result of the validity check, wherein based at least on the hash collision attempt being detected finding the object malicious and making further action relating to the received object comprising at least one of blocking or quarantining the object.

2. The method of claim 1, wherein the first hash value of the entity is generated by using a CRC (cyclic redundancy)-32 checksum.

3. The method of claim 1, wherein the second hash value for the entity is calculated by using one of: a SHA-2 algorithm or other cryptographic hash function having a 256 bit strength variant.

4. The method of claim 3, wherein the second hash value is calculated at the client computer or at the server computer.

5. The method of claim 1, wherein the second-preimage resistance is vulnerable to a second-preimage attack.

6. The method of claim 1, the validity check comprises detecting the hash collision attempt when the first hash value having the first collision resistance is being paired at the client computer with the second hash value having a stronger collision resistance than the first hash value.

7. The method of claim 1, further comprising storing the result of the validity check on a database at the client computer or at the server for sharing a reputation of the object with other client computers.

8. The method of claim 1, further comprising determining that the entity is malware based on the validity check.

9. A method, comprising:

detecting an attack by an attacker against a security function on a client computer, the method comprising, at a server computer, comprising:

receiving, from a client computer, a first hash value of an entity, whereby the first hash value of the entity is protecting the security function at the client computer, and the first hash value having a second-preimage resistance is generated using a first collision resistance, wherein the first hash value is generated to be weak and placed in a location that controls the security function on the client computer to enable the attacker use of the first hash value to bypass the security function causing the attack at the client computer to appear successful to the attacker;

storing to a database of known hash value pairs, a hash value pair comprising the first hash value and a second hash value calculated for the entity, the second hash value having a collision resistance stronger than the first hash value having the second-preimage resistance;

receiving, from the client computer, data relating to an object comprising a hash value pair of the object comprising a first hash value and a second hash value received with a request for the entity, at the client computer, from a second computer, wherein the attack is from the attacker via the second computer;

based on the first hash value of the object being determined as identical with the first hash value having the second-preimage resistance stored in the database accepting the received object and performing a validity check for the object wherein the validity check comprises comparing the hash value pair of the object with the hash value pair including the first hash value having the second-preimage resistance stored in the database at the server computer to determine whether the hash value pair of the object and the hash value pair of the entity stored in the database match;

receiving the result of the validity check, wherein based on the validity check identifying that the hash value pair of the object and the hash value pair of the entity in the database do not match, a hash collision attempt is detected;

transmitting the result of the validity check to the client computer; and based at least on the detected hash collision attempt, finding the object malicious and taking further action comprising at least one of blocking or quarantining the object.

10. The method of claim 9, the validity check further comprising detecting the hash collision attempt when a first hash value having the first collision resistance is being paired at the client computer with the second hash value having a stronger collision resistance than the first hash value.

11. The method of claim 9, further comprising storing the result of the validity check on a database at the server for sharing a reputation of the object with other client computers.

12. The method of claim 9, further comprising deciding at the server computer that the object is malware based on the validity check.

13. The method of claim 9, wherein the further action comprises sending an alarm or blocking the object based on the object being found malicious on the basis of the validity check.

14. A client computer comprising:

a processor for generating a first hash value of an entity, the first hash value having a second-preimage resistance, whereby the first hash value of the entity is generated using a using a first collision resistance, wherein the first hash value is generated to be weak and placed in a location that controls the security function on the client computer to enable an attack at the client computer use of the first hash value to bypass the security function causing the attack at the client computer to appear successful to the attacker;

a database for storing as a hash value pair of the entity the generated first hash value having the second-preimage resistance and a second hash value;

a transmitter for sending the first hash value to a server computer for storing to a local database of known hash value pairs, a hash value pair comprising the first hash value and a second hash value calculated for the entity, the second hash value having a collision resistance stronger than the first hash value;

a receiver receiving, from a second computer, a request for the entity with an object comprising a hash value pair of the received object comprising a first hash value and a second hash value;

a processor configured to accept the received object and transmitting data relating to the received object to the server computer for performing a validity check based on the first hash value of the received object being determined as identical to the first hash value stored in the local database, wherein the validity check comprises comparing the first hash value and the second hash value of the hash value pair of the object with the first hash value and the second hash value of the hash value pair of the entity stored in the local database at the server computer match; and based on the identifying that the hash value pair of the object and the hash value for the entity stored in the local database do not match, detecting a hash collision attempt in case the hash value pairs do not match;

a receiver for receiving the result of the validity check, and a processor for, based at least on the detected hash collision attempt, finding the object malicious and making further action relating to the received object comprising at least one of blocking or quarantining the object.

15. A server computer comprising:

a receiver for receiving, from a client computer, a first hash value of an entity, the first hash value having a second-preimage resistance, whereby the first hash value of entity is generated using a first collision resistance, wherein the first hash value is generated to be weak and placed in a location that controls the security function on the client computer to enable the attacker use of the first hash value to bypass the security function causing the attack at the client computer to appear successful to the attacker;

a database of known hash value pairs for storing as a hash value pair for the entity the received first hash value and a second hash value calculated for the entity, the second hash value having a collision-resistance stronger than the first hash value;

a receiver for receiving, from the client computer, data comprising a hash value pair of an object received with a request for the entity, at the client computer, from a second computer, wherein the first hash value is determined to be identical to the first hash value stored in the database;

a processor for performing based on the determining, a validity check for the object wherein the validity check comprises comparing the first hash value and the second hash value of the hash value pair of the object with the first hash value and the second hash value of the hash value pair for the entity stored in the database at the server computer, and based on the identifying that the hash value pair of the object and the hash value for the entity stored in the database do not match, detecting a hash collision attempt;

a transmitter for transmitting the result of the validity check to the client computer, and a processor for, based at least on the detected hash collision attempt, finding the object malicious and making further action relating to the received object comprising at least one of blocking or quarantining the object.

16. A computer program product comprising a non-transitory computer readable medium and a computer program comprising computer readable code which, when run on a computer system, causes the computer system to:

generate a first hash value of an entity, the first hash value having a second-preimage resistance, whereby the first hash value of the entity is generated using a first collision resistance, wherein the first hash value is generated to be weak and placed in a location that controls the security function on the client computer to enable the attacker use of the first hash value to bypass the security function causing the attack at the client computer to appear successful to the attacker;

store as a hash value pair for the entity to a database of known hash value pairs the generated first hash value and a second hash value calculated for the entity to a local database, the second hash value having a collision resistance stronger than the first hash value;

send the first hash value to a server computer for storing to a database of known hash value pairs, a hash value pair comprising the first hash value and a second hash value calculated for the entity;

receive, from a second computer, a request for the entity comprising a hash value pair of an object comprising a first hash value and a second hash value;

based on the first hash value of the received object being determined as identical with the first hash value stored in the local database, accept the received object and transmit data relating to the received object to the server computer for a validity check, wherein the validity check comprises comparing the first hash value and the second hash value of the hash value pair of the object with the first hash value and the second hash value of the hash value pair of the entity stored in the database at the server computer and detecting a hash collision attempt in case the hash value pairs do not match;

receive a result of the validity check, and based on the result indicating that the hash value pair of the object and the hash value pair of the entity in the database do not match, detect a collision attempt, and making further action relating to the received object comprising at least one of blocking or quarantining the object.

17. A computer program product comprising a non-transitory computer readable medium and a computer program comprising computer readable code which, when run on a server, causes the server to:

receive, from a client computer, a first hash value of an entity, the first hash value having a second-preimage resistance, whereby the first hash value of the entity is generated using a first collision resistance, wherein the first hash value is generated to be weak and placed in a location that controls the security function on the client computer to enable the attacker use of the first hash value to bypass the security function causing the attack at the client computer to appear successful to the attacker;

store to a database of known hash value pairs, a hash value pair comprising the first hash value and a second hash value calculated for the entity, the second hash value having a collision resistance stronger than the first hash value;

receive, from the client computer, data relating to an object comprising a hash value pair of the object comprising a first hash value and a second hash value received with a request for the entity, at the client computer, from a second computer;

based on the first hash value of the object being determined as identical with the first hash value stored in the database and a second hash value accept the received object and perform a validity check for the object wherein the validity check comprises comparing the hash value pair of the object with the hash value pair stored in the database at the server computer to determine whether the hash value pair of the object and the hash value pair of the entity stored in the database match; and transmit the result of the validity check to the client computer, wherein based on the hash value pair of the object and the hash value pair of the entity in the database being determined not to match detecting a hash collision, wherein based at least on the detected hash collision attempt, finding the object malicious and taking further action comprising at least one of blocking or quarantining the object making further action.

* * * * *